United States Patent Office 3,706,723
Patented Dec. 19, 1972

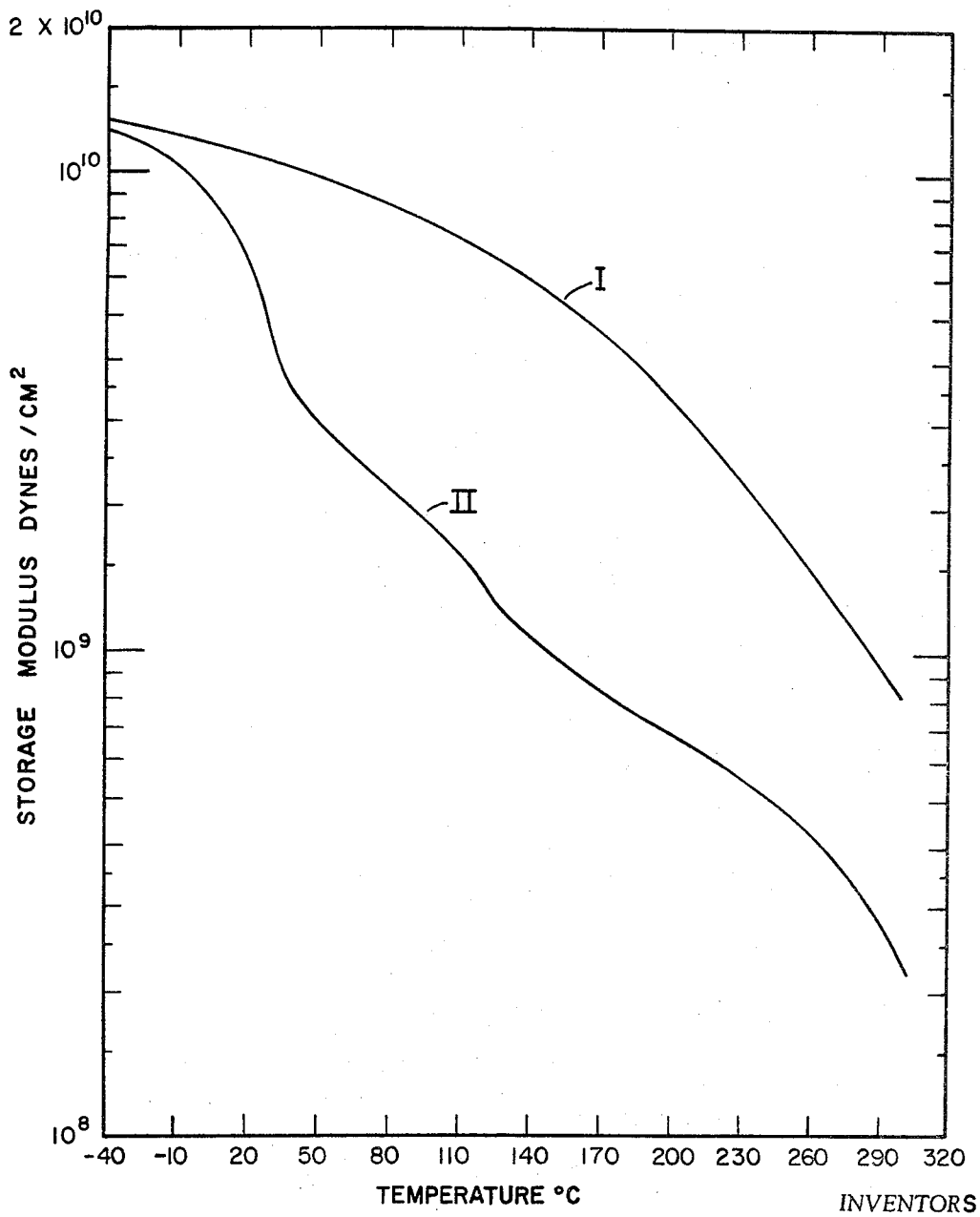

3,706,723
COPOLYMER OF 3,3,3 - TRIFLUORO-2-TRIFLU-OROMETHYL PROPENE AND VINYLIDENE FLUORIDE
Swayambu Chandrasekaran, East Orange, and Max B. Mueller, Morristown, N.J., assignors to Allied Chemical Corporation, New York, N.Y.
Filed Apr. 29, 1970, Ser. No. 32,944
Int. Cl. C08f 15/06
U.S. Cl. 260—87.7
9 Claims

ABSTRACT OF THE DISCLOSURE

Thermoplastic 3,3,3-trifluoro-2-trifluoromethyl propene/1,1-difluoroethylene copolymers are prepared by copolymerizing the monomers in liquid media in the presence of a free radical generating initiator. The copolymer products are melt-processable, retain their mechanical strength at high temperatures, and resist attack by corrosive agents and solvents.

BACKGROUND OF THE INVENTION

The present invention relates to new and useful fluorine-containing polymeric compositions having improved properties, and to their preparation. More particularly, this invention relates to 3,3,3-trifluoro-2-trifluoromethyl propene/1,1-difluoroethylene copolymers having excellent chemical inertness, good electrical properties, and high thermal stability. In another aspect, this invention relates to methods for making novel, high molecular weight, thermoplastic 3,3,3-trifluoro-2-trifluoromethyl propene/1,1-difluoroethylene copolymers.

Known fluorine-containing polymeric compositions include many which have found wide application by reason of their chemical inertness, good mechanical properties, and high thermal stability. There is always a need for new fluorine-containing polymeric compositions having improved properties.

Accordingly, it is an object of the present invention to provide novel fluorine-containing, chemically inert polymeric compositions having good mechanical properties, and a method for their preparation.

It is another object of this invention to provide fluorine-containing polymeric compositions having good thermal stability in combination with good mechanical strength, which retain their mechanical strength at high temperatures.

It is a further object of the present invention to provide fluorine-containing polymeric compositions having excellent resistance to attack by corrosive agents, such as acids, alkalis and strong oxidizing agents, as well as resistance to attack by organic solvents.

It is yet a further object to provide thermoplastic fluorine-containing polymeric compositions which can be melt processed by conventional extrusion and molding techniques.

Lastly, it is an object of the present invention to provide melt-processable thermoplastic fluorine-containing copolymer compositions which, in combination, have high melting points, good thermal stability, excellent mechanical properties at high temperatures, and which resist attack by corrosive agents and organic solvents at ordinary as well as at elevated temperatures, and a method for their preparation.

Various other objects and advantages of the present invention will become apparent to those skilled in the art from the following disclosure.

BRIEF SUMMARY OF THE INVENTION

The above objects are accomplished by the provision of copolymers of 3,3,3-trifluoro-2-trifluoromethyl propene with 1,1-difluoroethylene and of a method for their preparation by copolymerizing 3,3,3-trifluoro-2-trifluoromethyl propene with 1,1-difluoroethylene in a liquid medium in the presence of a free radical generating polymerization catalyst, as hereinafter described.

BRIEF DESCRIPTION OF THE DRAWING

The annexed drawing compares the relationship between the storage modulus (c.f. John D. Ferry, Viscoelastic Properties of Polymers, J. W. Wiley & Sons, Inc., New York, 1961, pp. 30–31) and temperature for an equimolar 3,3,3-trifluoro-2-trifluoromethyl propene/1,1-difluoroethylene copolymer of the present invention and for a homopolymer of tetrafluoroethylene. The storage modulus is a measure of dynamic mechanical strength. The drawing illustrates the superior mechanical performance of a copolymer of the present invention at elevated temperatures.

DETAILED DESCRIPTION

The 3,3,3-trifluoro-2-trifluoromethyl propene monomer starting material having the formula $(CF_3)_2C=CH_2$ may be prepared as described by Kauffman et al. in J. Org. Chem. 31, 3090 (1966). Briefly, its preparation involves refluxing hexafluoro-2-methyl-2-propanol with phosphorous pentachloride to obtain the desired 3,3,3-trifluoro-2-trifluoromethyl propene as non-condensed overhead product, together with concurrently formed hydrogen chloride. The hydrogen chloride can be removed from the crude overhead product by conventional techniques, such as by distillation or by scrubbing with alkaline media.

The 1,1-difluoroethylene monomer starting material is a commercially available product.

Copolymerization of these monomers is effected by contacting them in a suitable liquid polymerization medium in the presence of a free radical generating polymerization initiator.

Suitable liquid polymerization media include aqueous media as well as non-aqueous media, such as one or both of the liquid monomers, or non-polymerizable organic solvents, specifically those perfluorinated and perchlorofluorinated hydrocarbons containing up to about 10 carbon atoms which are liquid at the chosen polymerization temperature, and especially those perfluorinated and perchlorofluorinated alkanes of up to about 6 carbon atoms having melting points below about 80° C., and saturated perfluorocyclic ethers. A partial listing of organic solvents suitable for use as liquid polymerization media includes perfluorocyclobutane, pentachlorofluoroethane, trichlorotrifluoroethane, 1,1,2,2-tetrachloro-1,2-difluoroethane, 1,1,1,2-tetrachlorodifluoroethane, octafluoropropane, perfluoro-n-butane, perfluoro-n-pentane, trichlorofluoromethane, dichlorofluoromethane, dichlorodifluoromethane, 1,2-dichloro-1,1,2,2-tetrafluoroethane, and the like, the 3,3,3-trifluoro-2-trifluoromethyl propene monomer and octafluorocyclobutane being most preferred.

Suitable free radical generating polymerization initiators include organic peroxy compounds such as the well-known aliphatic and aromatic peroxy compounds, including the fluorine and chlorine substituted organic peroxides, as for example, 2,4-dichlorobenzoyl peroxide, t-butylperoxypivalate, pelargonyl peroxide, decanoyl peroxide, lauroyl peroxide, propionyl peroxide, acetyl peroxide, trifluoroacetyl peroxide, trichloroacetyl peroxide, perfluoropropionyl peroxide, succinic acid peroxide, t-butyl peroxyoctoate, benzoyl peroxide, p-chlorobenzoyl peroxide, t-butyl peroxyisobutyrate, t-butyl-peroxy maleic acid, 1-hydroxy-1'-hydroperoxy-dicyclohexyl peroxide, bis(1-hydroxycyclohexyl) peroxide, 2,5-dimethyl-hexane-2,5-diperbenzoate, t-butyl diperphthalate, t-butyl perbenzoate, n-butyl-4,4-bis(t-butylperoxy)valerate, ketone peroxide, 2,5-dimethyl-2,5-bis(t-butylperoxy)hexane, di-t-butyl peroxide, 2,5-dimethyl-2,5-bis(t-butyl peroxy)hexyne-3; organic azonitrile compounds such as azo-bis-isobutyronitrile, 2,2'-azo-bis-2,4-dimethylvaleronitrile, and 2,2'-azo-bis-2,3,3-trimethylbutyronitrile; peroxidic esters such as di-iso-propyl peroxydicarbonate, and others. Although the above-described free radical initiating polymerization initiators are especially suitable for making the copolymers of the present invention by copolymerizing the monomers using as liquid reaction medium one or both of the monomers per se, or using organic solvents as above described, they may also be used for carrying out the copolymerization in aqueous media in the presence or absence of emulsifying and/or suspending agents.

When the copolymerization is to be carried out in the presence of an aqueous medium, and, especially, in aqueous emulsion, there may additionally be used as free radical generating polymerization initiator water-soluble peroxides such as hydrogen peroxide, barium peroxide and sodium peroxide; persulfate, perphosphate and perborate salts of, e.g., sodium, potassium, calcium, barium and ammonium; and organic hydroperoxides such as cumene hydroperoxide or t-butyl hydroperoxide. These water-soluble free radical generating polymerization initiators may be used in conjunction with suitable reducing agents which act as catalyst activators, such as alkali metal bisulfites, alkali metal formaldehyde sulfoxylates, or sulfur dioxide. If desired, the above-described types of water soluble free radical generating polymerization initiators may be used in conjunction with known accelerators therefor, such as silver salts, for example, silver nitrate or silver nitrite, ferrous sulfate, ferrous nitrate, and others.

Generally, the initiator will be employed in amount of about 0.003 to about 3 percent, usually about 0.02 to about 1 percent by weight, based on the monomer charge. The initiator may be added initially, or, in order to maintain desired polymerization rates, intermittently or continuously throughout the polymerization.

Although not ordinarily preferred, copolymerization may also be initiated or catalyzed by active radiation, as may, for example, be provided by ultraviolet light, γ-rays and the like.

When the copolymerization is carried out in an aqueous medium, then it is preferably carried out at temperatures at which the 3,3,3-trifluoro-2-trifluoromethyl propene, under prevailing pressures, will be present within the polymerization medium in liquid phase. Copolymerization of the monomers in aqueous media may be carried out in the presence or absence of well-known buffering, suspending and emulsifying agents.

The copolymerization reaction in aqueous media is preferably conducted at a pH within the range of about 2 to 10, preferably within about 5 to 8, employing suitable buffers such as the carbonates, bicarbonates, phosphates, hydrogen phosphates, etc. of the alkali metals, for example, sodium carbonate, sodium bicarbonate, disodium hydrogen phosphate, and potassium pyrophosphate, or the borates of the alkali metals, such as sodium or potassium tetraborate.

Emulsifying agents suitable for use in carrying out the copolymerization in aqueous emulsion include the emulsifying agents customarily employed in emulsion polymerization of polymerizable ethylenically unsaturated organic compounds, such as alkali metal soaps of higher fatty acids, such as potassium, ammonium or sodium myristate, laurate, palmitate, oleate or stearate; the alkali metal or ammonium alkyl or alkylene sulfates or sulfonates, such as, e.g., sodium and/or potassium lauryl or decyl sulfate, cetyl and stearyl sulfonate; but especially the well-known polyfluorinated carboxylic acid emulsifying agents, such as perfluorooctanoic acid, and their alkali metal and ammonium salts, and the polyfluorinated sulfonic acids such as perfluoroalkyl sulfonic acids and their alkali metal and ammonium salts.

The suspending and emulsifying agents, if used, may be employed within wide ranges of concentration, but are ordinarily employed in amounts ranging from 0.05 to 5, preferably in amounts ranging from 0.1 to about 2 percent by weight, based on the weight of the aqueous medium.

Polymerization temperatures and pressure are not critical. The copolymerization may be carried out at temperatures within the range of about —80° to about 300° C., is preferably carried out at temperatures in the range of —20° to about 100° C., and more preferably, yet, at temperatures within the range of about —15° C. to about 80° C. When the copolymerization is to be conducted in an aqueous medium, then, of course, the polymerization temperature may not be lower than about 0° C. In any event, copolymerization in accordance with the present invention is carried out at temperatures above those at which the liquid polymerization medium employed will solidify, and the choice of copolymerization temperature will largely be governed by the desired decomposition rate at a given temperature of the particular initiator or initiator system employed. The copolymerization may be carried out at any desired pressure, pressures from about atmospheric to 3,000 atmospheres can be used, but it is suitably conducted at pressures ranging from about atmospheric to about 500 p.s.i.g. For reasons of economy in equipment design, the copolymerization is preferably carried out at pressures below about 200 p.s.i.g. While, ordinarily, the copolymerization will be conducted under autogenous pressure as it may prevail under chosen polymerization conditions, it may also be conducted under superimposed pressures, as obtained by charging the polymerization zone with a gas, such as, e.g. nitrogen.

If desired, the molecular weight of the copolymer product may be varied or controlled by inclusion in the polymerization recipe of one or more of the well-known chain transfer agents or chain transfer solvents.

Recovery of the copolymer product from the polymerization medium follows conventional procedure. When the reaction is carried out in 3,3,3-trifluoro-2-trifluoromethyl propene as liquid reaction medium, or in organic solvents as hereinabove defined, or in aqueous suspension, then the copolymer product is generally obtained as a white granular powder which can be readily separated from the reaction medium by conventional methods, such as gassing off the excess monomers and low boiling solvents, under reduced pressure and/or elevated temperature, if desired, or by filtration from the aqueous medium or higher boiling solvents. When the copolymerization is carried out in aqueous emulsion, then the copolymer product is generally obtained as a latex and may be recovered in conventional manner by first coagulating the latex, and then separating the coagulated product by filtration. Coagulation of the latex may be effected by methods well known to those skilled in the art, for example, by addition of electrolytes, by agitation, sonic vibration, and the like. In any event, the copolymer product after separation from the reaction medium is ordinarily washed with suitable solvents, as, e.g., methanol, to remove catalyst residues.

The following examples illustrate preparation of copolymer compositions of the present invention. The melting points (DSC melting points) reported herein were determined by differential scanning calorimetry, using a Model DSC-1 Differential Scanning Calorimeter manufactured by Perkin-Elmer at a heating rate of 20° C./min. In substance, melting point determination by differential scanning calorimetry involves heating, at predetermined rate of temperature increase, both a sample of the material the melting point of which is to be determined, and of a reference, so that both the sample and the reference are always maintained at the same temperature. The difference in energy input required to maintain both sample and reference at the same temperature is determined and plotted against the temperature of the sample. Thermal energy change within the sample due to its melting will record as a peak on that plot which thus provides an accurate record of the melting point of the sample.

Example 1

A 100 ml. glass reaction tube equipped with magnetic stirrer was immersed into a Dry-Ice/trichloroethylene bath was purged with nitrogen, and 0.025 gram of bis-trichloroacetyl peroxide were added under nitrogen purge in form of a 25 percent solution in 1,1,2-trichlorotrifluoroethane. The nitrogen purge was then stopped, and 5 grams of 3,3,3-trifluoro-2-trifluoromethyl propene were condensed in the tube, followed by 100 grams of perfluorocyclobutane and 19 grams of 1,1-difluoroethylene. Thus, the molar composition of the monomer feed was 10 mol percent of 3,3,3-trifluoro-2-trifluoromethyl propene and 90 mol percent of 1,1-difluoroethylene. After transfer into a liquid nitrogen bath (about −190° C.), and evacuation to about 0.1 mm. Hg pressure to remove air, the tube was sealed and immersed into a trichloroethylene bath maintained at 0° C., and tube contents were agitated for 6 hours. At the end of this period, the tube was vented, allowed to come to room temperature, and was evacuated, leaving the copolymer product as a dry powder. This powder was once washed with a small portion of dry methanol, was filtered, and was dried at 150° C. at 29″ Hg for a period of 20 hours. There were thus obtained 2.7 grams of the desired copolymer product in the form of a dry, white powder in 11.7 percent conversion, based on total amount of monomer charged. Elemental analysis of this copolymer product showed 32.65 percent carbon and 1.87 percent hydrogen, corresponding to a copolymer composition of 36 mol percent 3,3,3-trifluoro-2-trifluoromethyl propene and 64 mol percent 1,1-difluoroethylene. This copolymer product had a DSC melting point of 303° C.

Example 2

Example 1 was repeated using an agitator-equipped 250 ml. glass pressure reaction bottle, 0.07 gram bis-trichloroacetyl peroxide catalyst, 50 grams of 3,3,3-trifluoro-2-trifluoromethyl propene, 20 grams of 1,1-difluoroethylene and 150 grams of perfluorocyclobutane. The polymerization was carried out at a temperature of −15° C. After 75 hours' polymerization time, there were obtained 42.7 grams of dry white powdery copolymer product, corresponding to 61 percent conversion, based on the total amount of monomer charged. Elemental analysis of the copolymer product showed a carbon content of 31.70 percent, corresponding to a copolymer composition of 48.3 mol percent 3,3,3-trifluoro-2-trifluoromethyl propene and 51.7 mol percent 1,1-difluoroethylene. The copolymer product had a DSC melting point of 346° C.

Example 3

A 100 ml. pressure reaction bottle equipped with magnetic stirrer and pressure gauge was immersed into a Dry-Ice/trichloroethylene bath. The bottle was purged with dry nitrogen gas, and 0.05 gram of benzoyl peroxide were added, followed by 50 ml. of 1,1,2-trifluorotrichloroethane. A 50/50 mol percent 3,3,3-trifluoro-2-trifluoromethyl propene/1,1-difluoroethylene monomer mixture was made up by adding to an evacuated 1 liter cylinder gaseous 3,3,3-trifluoro-2-trifluoromethyl propene to pressurize the cylinder at ambient temperature of about 20° C. to a presure of 20 p.s.i.a., followed by addition of gaseous 1,1-difluoroethylene to pressurize the cylinder to a total pressure of 40 p.s.i.a. Then 6.45 grams of the 50/50 mol percent monomer mixture from the cylinder were condensed into the polymerization bottle under liquid nitrogen cooling, the bottle was sealed, heated to 80° C., and polymerization was allowed to proceed for a period of 5 hours at that temperature. Pressure in the bottle dropped an initial 270 p.s.i.a. to 215 p.s.i.a. after that 5 hour preiod. The bottle was then vented, the solid polymer product was separated from the liquid by filtration, and was washed once with dry methanol and dried. There were thus obtained 1.6 grams of dry white polymer powder in 24.8 percent yield based on the monomer charge, having a DSC melting point of 339° C. Elemental analysis of product showed a carbon content of 31.96 percent by weight, corresponding to a copolymer composition of 44.5 mol percent 3,3,3-trifluoro-2-trifluoromethyl propene and 55.5 mol percent 1,1-difluoroethylene.

Example 4

A stainless steel bomb of 75 ml. capacity was purged with dry nitrogen gas, and 40 ml. of deionized, deaerated water containing dissolved 0.20 gram of potassium persulfate, 0.5 gram of sodium pyrophosphate

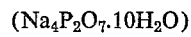
$(Na_4P_2O_7 \cdot 10H_2O)$ and 0.10 gram of sodium hydrogen sulfite were placed in the bomb. The bomb was evacuated at about room temperature, was submerged in a Dry Ice/trichloroethylene bath, and 13 grams of 3,3,3-trifluoro-2-trifluoromethyl propene were condensed into the bomb. The bomb was allowed to come to room temperature (about 20° C.), and was then pressurized with 1,1-difluoroethylene to 350 p.s.i.g. Thereafter the bomb was sealed, bomb and contents were heated to about 30° C., and were then maintained at that temperature under constant shaking for a period of 20 hours. During this 20 hour polymerization period, pressure within the bomb dropped from an initial pressure of 360 p.s.i.g. to a terminal pressure of about 70 p.s.i.g. After that 20 hour period bomb contents were discharged into a beaker. There was thus obtained a slightly turbid aqueous layer on which the polymer was floating as a white precipitate. The polymer was separated from the aqueous layer, washed once with water, followed by washing with dry methanol and drying at 120° C. at 29.9″ Hg. Yield of polymer product was 0.65 gram, corresponding to a conversion of about 4 percent, based on initial monomer charge. The polymer had a melting point of 325° C. Elemental analysis of the product showed a carbon content of 31.75 percent, corresponding to a composition of 47.9 mol percent 3,3,3-trifluoro-2-trifluoromethyl propene, the balance being 1,1-difluoroethylene.

Example 5

Following the procedure of Example 1, 8 grams of 3,3,3-trifluoro-2-trifluoromethyl propene and 0.39 gram of 1,1-difluoroethylene were copolymerized in a 100 ml. bottle in the presence of 50 grams of octafluorocyclobutane containing dissolved 0.04 gram of bis-trichloroacetyl peroxide at a temperature of −12° C. for a period of about 21 hours. The monomers were charged in a ratio of about 90 mol percent 3,3,3-trifluoro-2-trifluoromethyl propene and 10 mol percent 1,1-difluoroethylene. There were obtained 0.06 gram of dry copolymer product having a melting point of about 325° C. Elemental analysis of this copolymer product showed a carbon content of 31.42 percent by weight, corresponding to a composition of 52 mol percent 3,3,3-trifluoro-2-trifluoromethyl propene, the balance being 1,1-difluoroethylene.

Example 6

A 6 inch long quartz tube of ¼ inch diameter was charged with 0.75 gram of 3,3,3-trifluoro-2-trifluoromethyl propene and 0.31 gram of 1,1-difluoroethylene. The tube was sealed and was exposed to UV radiation provided by a 550 watt Hanovia (T.M.) High Pressure Mercury Lamp emitting UV radiation at wavelengths in the range of 1800 to 4000 angstroms at room temperature. After about 3 hours of irradiation small particles of polymer could be seen floating inside the reaction tube. Irradiation at room temperature (about 22° C.) was continued overnight. The U.V. light source was then removed, and the reactor was vented to obtain 0.21 gram of the copolymer as a fine white powder having a melting point of 325° C.

Example 7

A 2-liter stainless steel autoclave was charged with 1 liter of deionized, deaerated water containing dissolved 0.35 gram of potassium persulfate and 2.0 grams of the ammonium salt of perfluorooctanoic acid. The reactor was then evacuated, purged with nitrogen, reevacuated and 120 grams of 3,3,3-trifluoro-2-trifluoromethyl propene were condensed in. The contents of the reactor were heated to 65° C. and 1,1-difluoroethylene gas was then introduced to a total pressure of 500 p.s.i.g. Agitation of 700 r.p.m. was maintained through a reaction time of 3 hours at 65° C. At the end of this time, the reactor was vented and cooled to room temperature. There was obtained a latex with a solids content of 0.36 gm./cc., for a total yield of 36 grams of polymer product. This latex was coagulated by the addition of 50 cc. of concentrated HCl. The coagulum was filtered, washed three times with hot water and twice with methanol. The copolymer was then dried for 2 days at 140° C. and 29.9″ Hg vacuum to obtain a white, powdery polymer having a melting point of about 325° C. Infrared analysis confirmed the product to be the expected copolymer. Elemental analysis of the product showed a carbon content of 31.70% by weight, corresponding to a copolymer composition of 48.2 mol percent of 3,3,3-trifluoro-2-trifluoromethyl propene and 51.8 mol percent 1,1-difluoroethylene.

Example 8

A 2-liter stainless steel autoclave was charged with 1 liter of deionized, deaerated water, 0.50 gram potassium persulfate, 1.5 grams sodium lauryl sulfate and 10 grams sodium pyrophosphate ($Na_4P_2O_7 \cdot 10H_2O$). The pH of the solution was 10.8. The reactor was then evacuated, purged with nitrogen, reevacuated and charged with 70 grams of 3,3,3-trifluoro-2-trifluoromethyl propene and heated to 65° C. The reactor was then pressurized with 1,1-difluoroethylene to a total pressure of 500 p.s.i.g. and agitation started. The reaction was allowed to proceed for 20 hours at 65° C. and 700 r.p.m. agitation. At the end of this reaction period, the reactor was cooled to room temperature, vented and contents were discharged. Polymer latex of specific gravity 1.015, corresponding to 2.4% solids was obtained. This corresponds to polymer yield of 24 grams. The latex had a pH of 8.8 and it was coagulated by adding 50 cc. concentrated HCl and heating to 100° C. The coagulum was filtered, washed twice with water and once with methanol, and was dried at 140° C./29.9″ Hg vacuum for 3 hours. The product thus obtained melted at about 315° C. Infrared spectrum of a molded film of this product showed it to be a copolymer of 3,3,3-trifluoro-2-trifluoromethyl propene and 1,1-difluoroethylene.

Examples 9 thru 22

1,1-difluoroethylene was copolymerized with various amounts of 3,3,3-trifluoro-2-trifluoromethyl propene under the conditions set forth in Table I below to obtain copolymer products having the compositions and DSC melting points listed in that table.

TABLE I

| Example | Polymerization medium | Polymerization temp. (° C.) | Mol percent 3,3,3-trifluoro-2-trifluoro methyl propene in feed | Mol percent 3,3,3-trifluoro-2-trifluoro methyl propene in copolymer | M.P. (° C.) DSC 20°/min. |
|---|---|---|---|---|---|
| 9 | c-$C_4F_8$ | [1] 0 | 0 | 0 | 177 |
| 10 | c-$C_4F_8$ [3] | [2] 0 | 3 | 21.3 | 264 |
| 11 | c-$C_4F_8$ | 0 | 7 | 30.8 | 295 |
| 12 | c-$C_4F_8$ [4] | 80 | 10 | 31.5 | 301 |
| 13 | c-$C_4F_8$ | 0 | 14 | 37.5 | 320 |
| 14 | c-$C_4F_8$ | 0 | 20 | 39.5 | 329 |
| 15 | c-$C_4F_8$ | 0 | 30 | 42.0 | 327 |
| 16 | c-$C_4F_8$ | 0 | 40 | 46.0 | 335 |
| 17 | 1,1,2-trichloro-trifluoroethane | 80 | 50 | 44.5 | 339 |
| 18 | c-$C_4F_8$ | 0 | 50 | 47.8 | 350 |
| 19 | c-$C_4F_8$ | 0 | 60 | 47.7 | 349 |
| 20 | c-$C_4F_8$ | −15 | 45 | 49.7 | 351 |
| 21 | c-$C_4F_8$ | −15 | 60 | 48.5 | 349 |
| 22 | c-$C_4F_8$ | −12 | 90 | 52.0 | ca. 330 |

[1] Examples at 0° C., −12 and −15° C. were conducted using bis-trichloroacetyl peroxide as initiator.
[2] Examples at 80° C. were conducted using benzoyl peroxide as initiator.
[3] Polymerization conducted in liquid 3,3,3-trifluoro-2-trifluoromethyl propene monomer in the absence of added solvent.
[4] Polymerization conducted in a perfluorinated cyclic ether sold by Minnesota Mining and Manufacturing Company under the designation FC-75.

The 3,3,3 - trifluoro - 2 - trifluoromethyl propene/1,1-difluoroethylene copolymer products of the present invention generally contain from about 1 to about 55 mol percent of 3,3,3 - trifluoro - 2 - trifluoromethyl propene. Preferred copolymer compositions of the present invention contain from about 10 to about 52 mol percent of 3,3,3 - trifluoro - 2 - trifluoromethyl propene, more preferred copolymer composition containing from about 40 to about 51 mol percent of 3,3,3 - trifluoro - 2 - trifluoromethyl propene, with compositions containing from about 45 to about 51 mol percent of 3,3,3 - trifluoro - 2 - trifluoromethyl propene being more preferred yet. Most preferred copolymer compositions of the present invention, by reason of their outstanding properties at elevated temperatures, as hereinbelow illustrated, contain about equimolar amounts of 3,3,3-trifluoro-2-trifluoromethyl propene and 1,1-difluoroethylene, say between about 48 to about 51 mol percent of 3,3,3-trifluoro - 2 - trifluoromethyl propene.

In making the copolymer compositions of the present invention, the 3,3,3-trifluoro - 2 - trifluoromethyl propene and 1,1-difluoroethylene monomers are ordinarily employed in mol ratios of between 1:9 to 9:1. As is well known to those skilled in the art, copolymer composition is determined by the ratio in which the monomers are present in the polymerization zone, and by the reactivity ratios of the monomers. With respect to the polymerization method of the present invention, the reactivity ratios of the 3,3,3 - trifluoro - 2 - trifluoromethyl propene and 1,1-difluoroethylene have been found to be in the order of 0.047 and 0.136, respectively. Since the product of the reactivity ratios of these two monomers approaches zero (it is 0.0064), on theoretical basis the copolymer composition should approach 50/50 mol percent over a wide range of monomer feed composition. Theoretical considerations are confirmed by the experimental data summarized in Table I, supra, which indicate that about equimolar copolymers are obtained from monomer blends containing between about 40 and 90 mol percent 3,3,3-trifluoro-2-trifluoromethyl propene.

Preferred copolymer compositions of the present invention usually have a melting point, determined by differential scanning calorimetry (DSC) of at least about 200° C., the more preferred copolymer compositions usually having melting points of at least about 300° C. For applications wherein the unusually good high temperature performance characteristics of the copolymers of the present invention are of particular importance, we prefer to employ copolymers of the present invention having a DSC melting point of at least about 330° C., preferably of at least about 335° C.

Ordinarily the copolymers of the present invention are preferably made by copolymerizing the monomers in a liquid organic reaction medium at temperatures between about −15° C. and 80° C. under autogenous pressure, using an organic peroxide initiator, and employing the 3,3,3 - trifluoro - 2 - trifluoromethyl propene and 1,1-difluoroethylene monomers in mol ratios of from 1:9 to about 9:1. Octafluorocyclobutane, 1,1,2-trichlorotrifluoroethane, trichlorofluoromethane, octafluoropropane, perfluoro-n-heptane and 3,3,3 - trifluoro - 2 - trifluoromethyl propene are exemplary of preferred liquid organic reaction media, the 3,3,3 - trifluoro - 2 - trifluoromethyl propene and octafluorocyclobutane being most preferred. Preferred organic peroxide catalysts include bis-trichloroacetyl peroxide, benzoyl peroxide, 2,5- dichlorobenzoyl peroxide, acetyl peroxide, lauryl peroxide and diisopropyl peroxy dicarbonate.

The copolymers of the present invention combine the advantageous properties of high melting points, good thermal stability, excellent mechanical strength at elevated temperatures, melt processability and excellent resistance to attack even at elevated temperatures, by strong oxidizing agents, such as permanganates, chromates, hypochlorites, chlorates, concentrated sulfuric and nitric acids, oleum, nitrogen tetroxide and ozone; by corrosive agents, such as acids and alkalies; and by organic solvents. In addition thereto, they have good electrical insulating properties.

The unusually good properties of the copolymer products of the present invention are entirely unexpected and surprising because, as will be shown in the below-described comparative experiments, copolymer products of 3,3,3 - trifluoro - 2 - trifluoromethyl propene with ethylene or vinyl fluoride have melting points in the order of about 200° C. lower than the copolymer compositions of the present invention, and they are much less resistant to attack by solvents. Our attempts to prepare, for comparative purposes, copolymers of 3,3,3-trifluoro-2 - trifluoromethyl propene with tetrafluorethylene by methods herein described were unsuccessful.

COMPARATIVE EXPERIMENT 1

Attempted preparation of equimolar 3,3,3-trifluoro-2-trifluoromethyl propene/tetrafluoroethylene copolymer A dry nitrogen-purged 100 ml. glass reactor equipped with stirrer was charged with, in the order indicated, 0.10 ml. trichloroacetyl peroxide, 20 grams 3,3,3-trifluoro-2-trifluoromethyl propene, about 50 grams perfluorocyclobutane and 13 grams tetrafluoroethylene. The reactor was sealed and maintained under constant stirring at a temperature between −5° C. and +5° C. for a period of 3 hours. No polymer was formed during that 3 hour period.

COMPARATIVE EXPERIMENT 2

Preparation of about equimolar 3,3,3-trifluoro-2-trifluoromethyl propene/vinyl fluoride copolymer A glass reactor of about 400 ml. capacity equipped with magnetic stirrer was evacuated, purged with dry nitrogen, and chilled in a Dry-Ice/acetone bath to −78° C. Under continuing nitrogen purge the reactor was charged with 0.1 gram trichloroacetyl peroxide, 50 grams 3,3,3-trifluoro - 2 - trifluoromethyl propene, 200 grams perfluorocyclobutane and 13.8 grams vinyl fluoride, the monomer feed ratio corresponding to a 50/50 mol ratio. The reactor and contents were kept overnight with stirring at −12° C. Visual inspection the next morning showed that no polymer had formed. There was then added 1 ml. of a solution of 0.22 gram of trichloroacetyl peroxide in 1 ml. of trichlorotrifluoroethane, and the polymerization reaction was allowed to proceed at 0° C., After about 20 minutes, polymer formation could be observed in form of increasing turbidity of reactor contents. The reactor was then cooled to −15° C. and the reaction was allowed to proceed at that temperature for 24 hours. The reactor was then vented, the solid white polymer was slurried in hot methanol, was filtered, was once washed with methanol and was dried at 30″ Hg at 110° C. The yield of dry polymer amounted to 12 grams. The copolymer product, by carbon analysis, was shown to contain about 45 mol percent of vinyl fluoride. It had a melting point of about 115° C. It dissolved readily in acetone.

COMPARATIVE EXPERIMENT 3

Preparation of approximately equimolar 3,3,3-trifluoro-2-trifluoromethyl propene/ethylene copolymer A glass reactor of 100 ml. capacity equipped with magnetic stirrer was evacuated, purged with dry nitrogen gas and charged with 0.08 gram of trichloroacetyl peroxide, 27 grams 3,3,3-trifluoro-2-trifluoromethyl propene, 50 grams perfluorocyclobutane and 4.7 grams ethylene, the monomers being charged in 50/50 mol ratio. Polymerization was allowed to proceed under constant stirring at −12° C. for a period of 26 hours. A fair amount of polymer was visually observed after about 2 hours polymerization time. At the end of the 26 hour period, a large amount of solid white polymer was seen inside the reactor. The reactor was vented, evacuated and purged with nitrogen. Solid reactor contents were stirred in methanol, filtered and washed with small portions of methanol. The white copolymer product thus obtained was dried at 100° C. at 29″ Hg. The product had a DSC melting point of 140° C. and contained 48 mol percent ethylene, based on carbon analysis. A 100 mg. sample of this product dissolved completely in 2 ml. of hexafluorobenzene upon heating at 80° C. for 1 hour.

As the above comparative experiments show, equimolar copolymers of 3,3,3-trifluoro-2-trifluoromethyl propene with vinyl fluoride and ethylene respectively have melting points of 115° C. and about 140° C. Thus, neither of these copolymers is suitable for use in the high temperature applications for which the copolymers of the present invention are particularly suited. Furthemore, the copolymers of 3,3,3-trifluoro-2-trifluoromethyl propene with vinyl fluoride and ethylene are respectively soluble in acetone at room temperature, and in hexafluorobenzene at elevated temperature of about 80° C. The copolymer products of the present invention, in contradistinction thereto, are not soluble in acetone or hexafluorobenzene, or for that matter, in any of the common solvents, even at elevated temperatures.

To illustrate resistance to attack by solvents of a copolymer of the present invention, 100 mg. portions of a 3,3,3-trifluoro-2-trifluoromethyl propene/1,1-difluoroethylene copolymer containing 49.2 mol percent of 3,3,3-trifluoro-2-trifluoromethyl propene, having a DSC melting point of 341° C., were placed in 5 ml. of various solvents in 10 ml. glass vials equipped with aluminum foil lined screw cap, and were kept at elevated temperature for a period of 6 hours. After that 6 hour period, the solvent was filtered from the polymer and 5 ml. of methanol were added to the filtrate. The copolymer being insoluble in methanol, formation of a precipitate upon methanol addition would indicate that some of the polymer had been dissolved in the solvent. Table II below lists the solvent employed, the temperature of test and whether or not a precipitate formed upon methanol addition.

TABLE II

| Test No. | Solvent | Test temp., °C. | Precipitate formed upon methanol addition | Remarks |
|---|---|---|---|---|
| 1 | 2,5-dichlorobenzotrifluoride | 140 | No precipitate formed | Polymer did not swell or dissolve. |
| 2 | Dimethylformamide | 120 | do | No swelling of polymer observed. |
| 3 | Dimethylsulfoxide | 100 | do | No swelling or dissolution. |
| 4 | Pentafluorobenzonitrile | 140 | do | Do. |
| 5 | 4-chloro-3-nitrobenzotrifluoride | 140 | do | Do. |
| 6 | Ditrifluoromethyl xylene | 100 | do | Do. |
| 7 | Perfluorocyclic ether sold as "Freon E-4" (T.M.) | 150 | do | Do. |
| 8 | Chloropentafluoroacetone trihydrate | 100 | do | Do. |
| 9 | Perfluoroalkane (boiling range 115-225° C.) | 100 | do | Do. |
| 10 | do [1] | 150 | do | Do. |
| 11 | Ethyl acetate | 50 | do | Polymer swelled, but did not dissolve. |
| 12 | Perfluorokerosene-low boiling | 100 | do | No swelling or dissolution. |
| 13 | $C_7F_{15}OH$ | 115 | do | Do. |
| 14 | $\alpha, \alpha, \alpha$-trifluorotoluene | 100 | No precipitate formed | Do. |
| 15 | Hexafluoroacetone trihydrate | 100 | do | No swelling or dissolution—no turbidity on cooling. |
| 16 | 1,3-di-(trifluoromethyl)-benzene | 100 | do | No swelling or dissolution. |
| 17 | Trifluoroethanol | 100 | do | Do. |
| 18 | Hexamethyl phosphoric triamide | 140 | do | No dissolution, but shredded and discolored to light yellow color. |
| 19 | Dioxane | 100 | do | No swelling or dissolution. |
| 20 | o-Dichlorobenzene | 160 | do | Do. |
| 21 | Low molecular weight chlorotrifluoroethylene oil sold as "Kel-F Oil 3" | 250 | do | Slight swelling of polymer but no solution. |
| 22 | Tetrachloroethylene | 140 | do | No swelling or dissolution. |
| 23 | Acetone | 55 | do | Do. |
| 24 | Methanol | 65 | do | Do. |
| 25 | Hexafluorobenzene | 80 | do | Do. |

[1] This test was conducted in a sealed tube using 15 ml. of solvent.

About equimolar 3,3,3-trifluoro-2-trifluoromethyl propene/1,1-difluoroethylene copolymers of the present invention ordinarily have melt indices, determined by the procedure of ASTM D 1238–65T, measured at 350° C. using a 1.2 kilogram load, below about 4. The ultimate tensile strength of about equimolar copolymers of the present invention having a melt index of about 1.0 or less ranges between about 2800 and 7000 p.s.i. when measured at 20° C. in accordance with ASTM method D1708–66. About equimolar copolymers of the present invention have shown ultimate tensile strengths at 200° C. and 300° C. of up to 4000 p.s.i. and 3200 p.s.i. respectively. Here it should be noted that at 200° C. copolymers of 3,3,3-trifluoro-2-trifluoromethyl propene with either vinyl fluoride or ethylene have no mechanical strength at all, because their respective melting points are well below that temperature.

The dynamic mechanical strength of aboue equimolar copolymers of the present invention is outstanding even at high temperatures. Storage moduli (dynes/cm.$^2$), respectively determined at 20° C. and 200° C. on five mil films using a Vibron (T.M.) Viscoelastometer manufactured by Toyo Measurement Instruments Company, range from between $1.10 \times 10^{10}$ dynes/cm.$^2$ at 20° C. to $3.4 \times 10^9$ dynes/cm.$^2$ at 200° C. As illustrated in the annexed drawing, this compares favorably to polytetrafluoroethylene, which has storage moduli at 20° C. in the order of $6.5 \times 10^9$ dynes/cm.$^2$, and at 200° C. in the order of about $7 \times 10^8$ dynes/cm.$^2$. Indeed, throughout the temperature range tested from −20° C. to 300° C. about equimolar copolymers of the present invention have storage moduli substantially higher than those of polytetrafluoroethylene.

The exceptional thermal stability of the copolymers of the present invention was further confirmed by thermal gravimetric analysis in hydrogen as well as air, using a programmed heating rate of 10° C. per minute. Table III, below, summarizes the results obtained and compares the date obtained for a 1,1-difluoroethylene homopolymer with those of copolymers of the present invention containing between about 42–50 mol percent of 3,3,3-trifluoro-2-trifluoromethyl propene.

TABLE III.—THERMAL GRAVIMETRIC ANALYSIS

| Copolymer composition,[1] mol percent | Percent weight loss | | | | | $t_D$ (°C.)[2] |
|---|---|---|---|---|---|---|
| | In nitrogen at— | | | In air at— | | |
| | 350° C. | 400° C. | 500° C. | 350 °C. | 400° C. | |
| 0[3] | 21 | 66 | 79 | 30.5 | 60 | 275 |
| 42 | 2.2 | 8 | 65 | 3.6 | 43 | 400 |
| 47.3 | 2.0 | 2.5 | 55 | 1 | 26 | 425 |
| 49.7 | 0.03 | 0.22 | 53 | 0.06 | 8.5 | 445 |

[1] Mol percent 3,3,3-trifluoro-2-trifluoromethyl propene.
[2] The temperature at which catastrophic weight loss begins to occur in nitrogen atmosphere.
[3] 1,1-difluoroethylene homopolymer.

The copolymers of the present invention will not sustain combustion but are self-extinguishing. A 5 mil thick film of about equimolar copolymer of the present invention are held into the flame of a Bunsen burner. The film ignited and flamed. Upon removal from the flame, however, the polymer was self-extinguishing.

Copolymers of the present invention are eminently suited for making a wide variety of useful products, such as film, sheets, solid objects, coatings, fibers, filaments and the like. These products are especially suited for use in application where their strength at high temperature, resistance to chemical attack, and their good electrical insulating properties may be advantageously employed. The copolymer compositions of the present invention are melt processable, hence can be fabricated in conventional manner by extrusion, calendering, molding and the like. Illustrative uses of the copolymers of the present invention include ball bearings, O-rings, washers, gaskets, wire coatings, valve diaphrams, pumps, seals, tubing, pipe, film, sheets, protective coatings, tank linings, mounting boards for electric and electronic assemblies, electrical insulators and the like. The excellent properties of the copolymers of the present invention may, for certain purposes, if desired, be improved by incorporating therein inert fillers, such as asbestos, glass, metal powders, diamond powder, abrasive powders, graphite, cork flour, and the like. Such fillers generally may be incorporated for the purpose of improving such properties as resistance to creeping under load, resistance to wear by rotating shafts, stiffness, thermal conductivity, electrical insulating properties and hardness. If desired, fillers may also be incorporated for a variety of other purposes, as, for example, pigmentation, lubrication or cost reduction. Although these, and similar fillers, are preferably added to the preformed polymer, those which do not interfere with the polymerization may, if desired, be included in the polymerization mixture and the polymerization can be carried out in their presence.

Since various changes and modifications may be made in the invention without departing from the spirit and essential characteristics thereof, it is intended that all matter contained in the above description shall be interpreted as illustrative only, the invention being limited only by the scope of the appended claims.

We claim:

1. A copolymer of 3,3,3 - trifluoro - 2 - trifluoromethyl propene and 1,1-difluoroethylene having a melting point of at least 200° C. Containing from about 10 to about 52 mol percent of 3,3,3-trifluoro-2-trifluoromethyl propene and correspondingly from about 90 to about 48 mol percent of 1,1-difluoroethylene.

2. A copolymer according to claim 1 containing from about 40 to about 51 mol percent of 3,3,3-trifluoro-2-trifluoromethyl propene and correspondingly from about 60 to about 49 mol percent of 1,1-difluoroethylene.

3. A copolymer of claim 2 having a melting point of at least 300° C.

4. A copolymer accordng to claim 1 containing from about 45 to about 51 mol percent of 3,3,3-trifluoro-2-trifluoromethyl propene and correspondingly from about 55 to about 49 mol percent of 1,1-difluoroethylene.

5. A copolymer of claim 4 having a melting point of at least 330° C.

6. A copolymer according to claim 1 containing about equimolar proportions of 3,3,3-trifluoro-2-trifluoromethyl propene and 1,1-difluoroethylene.

7. A copolymer of claim 6 having a melting point of at least 335° C.

8. A film made from a copolymer according to claim 1.

9. A molded article made from a copolymer according to claim 1.

References Cited
UNITED STATES PATENTS

| | | | |
|---|---|---|---|
| 2,885,448 | 5/1959 | Miller | 260—653.1 |
| 3,089,866 | 5/1963 | Crawford, Jr. | 260—92.1 |
| 3,240,757 | 3/1966 | Sterling | 260—63 |
| 3,398,128 | 8/1968 | Bolstad | 260—87.7 |
| 3,467,636 | 9/1969 | Nersasian | 260—80.77 |
| 3,475,396 | 10/1969 | McCain | 260—92.1 |
| 3,519,703 | 7/1970 | Merkl | 260—897 |

JAMES A. SEIDLECK, Primary Examiner

C. A. HENDERSON, Jr., Assistant Examiner

U.S. Cl. X.R.

260—41 R, 41 B